Sept. 29, 1970 P. HUIJER 3,531,780

MAGNETORESISTIVE READOUT OF MAGNETIC THIN FILM MEMORIES

Filed Nov. 13, 1961

INVENTOR
PIETER HUIJER.
BY Frank R. Jinfani
AGENT

United States Patent Office 3,531,780
Patented Sept. 29, 1970

3,531,780

MAGNETORESISTIVE READOUT OF MAGNETIC THIN FILM MEMORIES

Pieter Huijer, Eindhoven, Netherlands, assignor, by mesne assignments, to U.S. Philips Corporation, New York, N.Y., a corporation of Delaware Filed Nov. 13, 1961, Ser. No. 151,618
Claims priority, application Netherlands, Dec. 1, 1960, 258,618
Int. Cl. G11c *5/02, 11/14*
U.S. Cl. 340—174 12 Claims

ABSTRACT OF THE DISCLOSURE

A storage array having a plurality of magnetic elements with magnetoresistive properties is provided with a conductor electrically passing a current flow thru each of said elements. Magnetic fields are applied to a selected element for varying the effects of the magnetoresistance relative to the current flow thru the element. The resultant variation across the selected element is an indication of the stored condition of the element selected.

This invention relates to a memory or storage element consisting of conductive magnetic material having a rectangular hysteresis curve; the memory element is physically in the form of a thin film having a preferential orientation of the magnetization in the plane of the film. The invention also pertains to a matrix built up from these thin films. In order to determine the magnetization condition, which is indicative of stored information, the general practice is to set up a magnetic field having a component at right angles to the preferential orientation of the magnetization.

It is the usual practice to attempt to render the physical dimensions of such magnetic thin film memory elements as small as possible in order to decrease interference signals, control power and switching times.

It is an object of the invention to provide a magnetic thin film memory element of the above type, in which the intensities of the signals to be derived from the memory element (these signals being a measure of the information condition of the element) are adjustable independently of the physical dimensions of the element.

It is another object of the invention to provide readout means which will give a read-out signal independent of the dimensions of the memory element.

According to the invention, these objects are attained by using an electric current as the read-out signal, the electric current being passed through the film and the change of the current being measured.

The invention also consists of wiring a plurality of magnetic thin film memory elements according to the rows and columns of a matrix, in which successive elements of the same row or column of the matrix are conductively connected.

Figure 1:
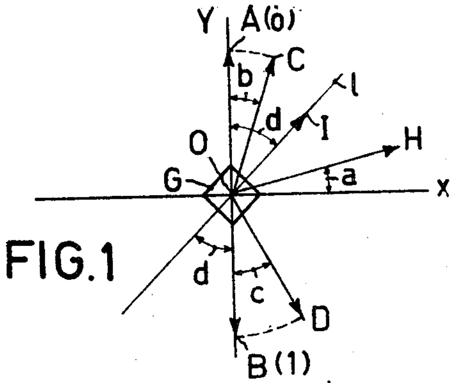
Figure 2:
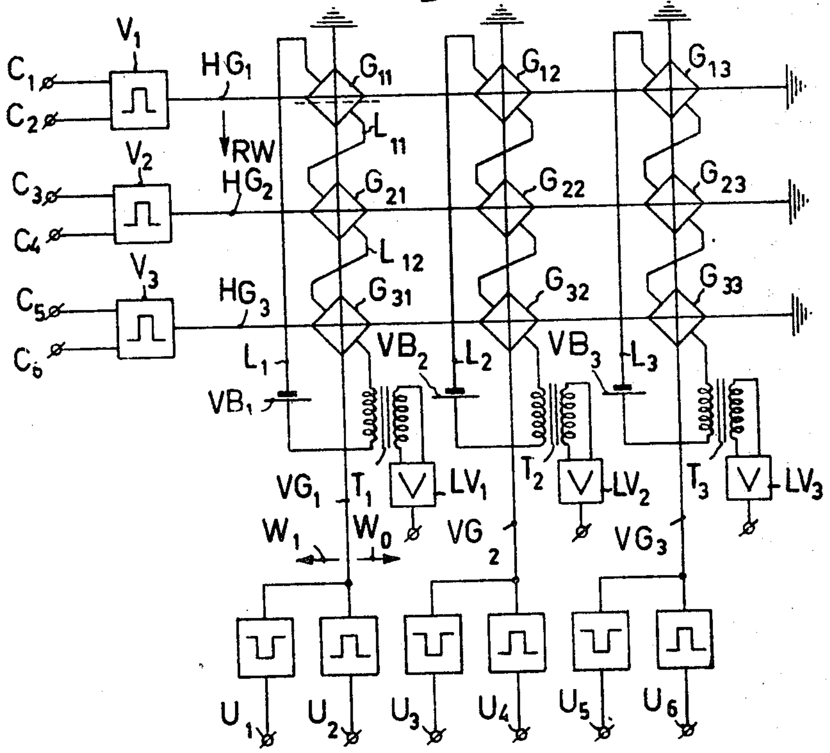
Figure 3:
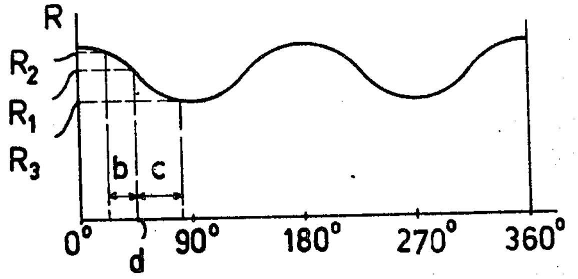

In order that the invention may be readily carried into effect, one embodiment thereof will now be described more fully, by way of example, with reference to the accompanying drawing, in which:

FIG. 1 is a diagram showing various magnetization directions in a thin film memory element; and FIG. 3 shows a resistance characteristic to explain the operation of the memory element; while FIG. 2 shows a matrix memory device provided with magnetic thin film memory elements according to the invention.

In FIG. 1, a memory element G is shown in plan view in the origin O of the co-ordinate axes $x$–$y$. Such an element comprises a thin film consisting of conductive magnetic material.

It is a known property of such thin films that below a certain limiting value of the thickness of the film, large Weiss domains may be formed, in which the magnetization is fo equal orientation. The memory element comprises one Weiss domain.

Such a memory element may be manufactured by vapor-depositing magnetic material in vacuo on a heated glass plate. If a magnetic field is set up during the deposition, the memory element shows uniaxial anisotropy having a preferential orientation of the magnetization which is parallel to the magnetic field.

The hysteresis curve of the memory element measured in the preferential orientation of the magnetization is rectangular. This means that the magnetization in the preferential orientation may assume two stable states. In FIG. 1, the preferential orientation is shown as directed along the y-axis. In the absence of an external magnetic field, the magnetization is oriented according to the positive $y$-axis, point A, or according to the negative $y$-axis, point B. These two magnetization conditions may be considered as two different information conditions. For example, the binary figure 0 may be associated with point A and the binary figure 1 may be associated with point B.

It is known in addition that by setting up a sufficiently strong external magnetic field, the change of the magnetization of the memory element indicated takes place by means of rotation of the magnetization and not by the movement of magnetic walls (domain-walls).

Under the influence of an external magnetic field, for example the field H, which makes an angle $a$ with the positive $x$-axis, the magnetization turns towards the direction of the field. In addition, due to the uniaxial anisotropy, a force which causes the magnetization to return to the $y$-axis acts upon the magnetization. Due to this combination of forces, the magnetization assumes a state between the direction of the $y$-axis and the direction of the field H.

If the memory element has stored the binary figure 0, the magnetization turns from A to C through an angle $b$. If the memory has stored the binary figure 1, the magnetization turns from B to D through an angle $c$. The angles $b$ and $c$ are unequal because of the different initial orientation of the magnetization with respect to the magnetic field. Both angles are equal if the magnetic field is oriented according to the $x$-axis, i.e., if the angle $a=0°$. After removing the magnetic field, the magnetization returns to the preferential orientation along the $y$-axis.

It is known to determine the information condition of the memory element by using the rotation of the magnetization as described above. For this purpose, the change of the magnetization in the direction of the $y$-axis is measured with a conductor which is inductively coupled to the thin film and is physically directed along the $x$-axis. The voltage induced in this conductor is proportional to the switching speed, i.e., the speed of rotation of the magnetization; the induced voltage is also proportional to the volume of the element. In practice, the requirement is imposed that the output voltage must have a definite minimum value. As a result of this, the volume of the element, assuming a definite switching time, may not decrease below a definite limiting value.

It is known in addition that the magnetization of the memory element can be changed by setting up a small magnetic field in the preferential orientation if at the same time a strong magnetic field is set up at right angles to the preferential orientation. This may be seen from the figure by assuming the angle $a=0°$ and assuming the field H so strong that the angles $b$ and $c$ are approximately 90°. In this condition of the magnetization, a small field in the preferential orientation is sufficient to cause the magnetization to pass the $x$-axis, as a result of which the magnetization, after the field H has been removed, passes into the nearest stable state.

In FIG. 2, a matrix memory device is shown with the magnetic thin film memory elements G11–G33. The preferential orientation of the magnetization is the same for all the elements and has the direction as is indicated by the broken line at the memory element G11. The conductors HG1–HG3 are inductively coupled to the elements of the same row, respectively. The conductors VG1–VG3 are inductively coupled to the elements of the same column, respectively. Each of the pulse generators V1–V3 has two control terminals: the terminals C1, C3, C5 are used when writing information, the terminals C2, C4, C6 are used when reading information. Each of the pulse generators V1–V3 supplies a current pulse for read-out of information which is smaller in amplitude than the pulse supplied for writing. Each of the conductors VG1–VG3 is coupled to two pulse generator which can supply comparatively weak pulses of opposite polarities. The generators associated with terminals U1, U3, U5 are used for supplying the information 0 and the generators associated with terminals U2, U4, U6 for supplying the information 1.

At the conductor HG1 the arrow RW indicates the direction of the magnetic field in the memory elements of the first row produced by a current pulse. At conductor VG1, the directions $W_1$ and $W_0$ indicate the magnetic field in the memory elements of the first column produced by a current pulse for the information 1 and 0, respectively.

The conductors L1, L2, L3, L11, and L12 in FIG. 2 are provided for read-out in accordance with the invention. Their function and the manner in which they are coupled to the memory elements will be described below.

Supplying information to a row occurs as follows: The first row is considered as an example. First, a control pulse is applied to the terminal C1. The pulse generator V1 then supplies a current pulse through conductor HG1 having an amplitude such that the magnetization of any of the elements G11–G13 in the horizontal condition is brought into the vertical condition. As is described above, only a small magnetic field in the preferential orientation is then required to bring the element into the condition 1 or into the condition 0. These magnetic fields are produced with current pulses through the conductors VG1–VG3. Before the end of the current pulse through conductor HG1, one of the pulse generators at each of the vertical conductors is activated in accordance with the information to be stored. Then the elements G11–G13 are in the desired information condition.

Reading the information of a row occurs as follows: The first row is again considered as an example. A control pulse is applied to the terminal C2 of the pulse generator V1. The pulse generator V1 then supplies to the conductor HG1 a current pulse which has an amplitude less than that supplied when a pulse is applied to terminal C1; the smaller amplitude is used because the magnetization is rotated through a smaller angle during readout than during writing. As a result of the pulse application, the magnetization of the elements G11–G13 turns to the vertical direction through a definite angle. The direction of the turning, i.e., clockwise or counter-clockwise, depends on the information condition of the magnetic element considered. As a result of this turning, a pulse is produced, in a manner to be described, having a definite polarity. These pulses are supplied through conductors L1–L3 to the reading amplifiers LV1–LV3 by means of transformers T1–T3 for further amplification.

For reading the information condition of a memory element according to the invention, the dependence of the resistance of a memory element on the orientation of the magnetization is used. This dependency has become known in the literature as the magneto-resistance effect. The behavior of the resistance of a magnetic thin film memory element may be considered by passing a current through the element in a definite direction and determining the voltage drop across the element. It appears that the resistance is greatest if the direction of the magnetization is parallel to the direction of the current. The resistance is least when the direction of the current is at right angles to the direction of the magnetization. The magneto-resistance effect occurs inter alia for all the nickel-iron-cobalt alloys which are magnetic. In this group, the effect is largest for the alloys 80Ni-20Fe and 70Ni-30Co. For these alloys, the relative difference between the greatest and least resistance value at room temperature is approximately 5% and at a low temperature of −200° C. approximately 20%.

In FIG. 3, the resistance R of a memory element is plotted against the angle between the direction of the current and the orientation of the magnetization. The curve has a maximum at 0° and 180° and a minimum at 90° and 270°. For the sake of clarity, the difference between the maximum and minimum resistance values is shown larger than it is in reality.

In FIG. 1, a straight line 1 is shown drawn through the origin O making an angle $d$ with the $y$-axis. A measuring current I is passed through the memory element in the direction of the straight line. In the rest condition, the magnetization is oriented along the $y$-axis, so that the resistance in the direction of the current has the value R1 as shown in FIG. 3. Then, the magnetic field H is set up, as a result of which the magnetization turns from A to C for the information condition 0 and from B to D for the information condition 1. In the first case, the angle between the direction of current and the magnetization decreases, as a result of which the resistance increases to the value R2 (FIG. 3). In the second case, the angle between the direction of current and the magnetization increases, as a result of which the resistance decreases to a value R3 (FIG. 3). The resistance variation may be converted into current or voltage variations which can be further amplified.

It can be seen from FIG. 3 that the positive and negative resistance variations are greatest if the angles $b$, $c$ and $d$ are 45°. The angles $b$ and $c$ are equal if the magnetic field H is set up in the direction of the $x$-axis. By suitable choice of the field strength, these angles become 45°. After removing the magnetic field, the magnetization returns to the nearest stable state A or B. This means that the original information condition of the element is maintained.

The voltage variation across an element is equal to the variation of the resistance multiplied by the measuring current. For each value of the average resistance of the element, a value of the measuring current may be adjusted, so that the voltage variation meets the requirements of the circuit arrangement and any other device used in conjunction therewith.

The average value of the resistance of a memory element is proportional to its length and inversely proportional to its cross section. For a memory element in the form of a square, the resistance is inversely proportional to the thickness. For a thickness of 100 angstrom units the resistance for the alloys noted above is approximately 10 ohms. The other proportions of the memory element are not determinative of the resistance value; it is seen, therefore, that by using the magnetoresistive effect according to the invention, memory elements may be used having a very small area, for example, of the order of magnitude of .01 $mm^2$.

Referring now once again to FIG. 2, in the memory device shown therein the supply sources VB1, VB2 and VB3 pass a measuring current through the conductors L1, L2 and L3, the latter being conductively connected to associated ones of magnetic thin film memory elements G11–G33. This current flows in series through all the memory elements of a column. The direction of the current in the memory elements makes an angle of 45° with the preferential orientation of the magnetization.

The elements of a column are connected together through intermediate conductors. In this manner, in the first column the intermediate conductor L11 conductively connects the memory elements G11 and G21 and the intermediate conductor L12 conductively connects the elements G21 and G31.

It is noted that the wire-shaped conductors shown in FIG. 2 may in practice be tape-shaped conductors of the same transverse proportions as the memory elements and that the vertical and horizontal conductors are insulated from one another.

Thus, by using the conductive connections to a conductive magnetic thin-film memory element as set forth above, the memory element may be made very small; by increasing the current through the element, the read-out signal can be increased. When inductive coupling is used, as in the prior art, the output or read-out signal depends on the switched flux and thus on the volume of the element. The output signal also depends on switching speed when using inductive coupling, while the output when using a conductive connection does not depend on switching speed.

While the invention has been described with respect to a specific embodiment, various other modifications and embodiments will be apparent to those skilled in the art without departing from the inventive concept, the scope of which is set forth in the appended claims.

What is claimed is:

1. A memory element comprising a thin film composed of a conductive magnetic material having a substantially rectangular hysteresis curve with a preferential orientation of magnetization in the plane of the film, means for determining the magnetization condition of the element comprising means for setting up a magnetic field having a component at right angles to the preferential orientation of the magnetization, a source of power, and electrically conductive means conductively connected to said thin film and electrically conductively interconnecting said thin film and said source of power for detecting the change of current flow through said element due to the setting up of said magnetic field.

2. A memory element comprising a thin film composed of a conductive magnetic material having a substantially rectangular hysteresis curve with a preferential orientation of magnetization in the plane of the film, means for determining the magnetization condition of the element comprising means inductively coupled to said thin film for setting up a magnetic field co-acting with said thin film, a source of power, and electrically conductive means conductively connected to said thin film and electrically conductively interconnecting said thin film and said source of power for detecting the change of current flow through said memory element due to the setting up of said magnetic field.

3. A memory system comprising: a thin film composed of a conductive magnetic material having a substantially rectangular hysteresis curve with a preferential orientation of magnetization in the plane of the film, first means inductively coupled to said element, means for applying input information to said inductive coupling to change the magnetization condition of said element corresponding to said input information, means for determining the storage condition of said film comprising second means inductively coupled to said film for setting up a magnetic field co-acting with said film, a source of power, and electrically conductive means conductively connected to said film and electrically conductively interconnecting said thin film and said source of power for detecting the change of current flow through said thin film.

4. A memory system comprising a plurality of elements consisting of conductive magnetic material having a substantially rectangular hysteresis curve, each of said elements being in the form of a thin film with a preferential orientation of the magnetization in the plane of the film, said elements being arranged in the form of a matrix having a plurality of rows and columns, horizontal conductor means inductively coupled to selected rows, vertical conductor means inductively coupled to selected columns, means for supplying pulses of a predetermined magnitude to selected ones of said horizontal and vertical conductors for supplying information to a selected element, means for supplying a pulse of a predetermined magnitude to a selected one of said conductors for reading-out said information, and electrically conductive means conductively connected to successive elements of a single row or column and electrically conductively interconnecting said successive elements.

5. A memory system comprising a plurality of elements consisting of conductive magnetic material having a substantially rectangular hysteresis curve, each of said elements being in the form of a thin film with a preferential orientation of the magnetization in the plane of the film, said elements being arranged in the form of a matrix having a plurality of rows and columns, horizontal conductor means coupled to selected rows, vertical conductor means coupled to selected columns, means for supplying pulses of a predetermined magnitude to selected ones of said horizontal and vertical conductors for supplying information to a selected element, means for applying a read-out pulse of a predetermined magnitude to a selected one of said conductors for reading-out said information, conductive means conductively connected to successive elements of a single row or column and electrically conductively interconnecting said successive elements, means for supplying a current to said successive elements through said conductive means, and means for detecting the change of said current due to the application of said read-out pulse.

6. A memory system comprising a plurality of elements consisting of conductive magnetic material having a substantially rectangular hysteresis curve, each of said elements being in the form of a thin film with a preferential orientation of the magnetization in the plane of the film, said elements being arranged in the form of a matrix having a plurality of rows and columns, horizontal conductor means coupled to selected rows, vertical conductor means coupled to selected columns, means for supplying pulses of a predetermined magnitude to selected ones of said horizontal and vertical conductors for supplying information to a selected element, means for setting up a magnetic field at a selected element having a component at right angles to the preferential orientation of the magnetization for reading-out said information, electrically conductive means conductively connected to successive elements of a single row or column and electrically conductively interconnecting said successive elements, means for supplying a current to said successive elements through said conductive means, and means for detecting the change of said current due to the application of said read-out pulse.

7. A bistable storage device comprising a ferromagnetic element possessing magnetoresistive properties, means for providing current flow through said element in a given direction, means for applying a magnetic field to said element in a first direction, and means for selectively applying a magnetic field to said element in a second direction transverse to said first direction whereby a voltage of a first and a second magnitude are obtained across element determined by said last applied magnetic field.

8. A bistable storage device comprising a ferromagnetic storage element possessing magnetoresistive properties, means electrically connected to said ferromagnetic storage element for providing a current flow through said element in a given direction, first means inductively coupled to said element for applying a magnetic field to said element in a first direction, second means inductively coupled to said element for applying a magnetic field to said element in a second direction transverse to said first direction, and means for detecting the change of current flow through said element in accordance with the application of said magnetic field.

9. A bistable storage device comprising a ferromagnetic element possessing magnetoresistive properties, means for providing current flow through said element in a given direction, means for applying a magnetic field to said element in a first direction, and means for applying a magnetic field to said element in a second direction transverse to said first direction whereby a voltage of a first and a second magnitude are obtained across the element determined by said last applied magnetic field.

10. A memory system comprising a plurality of elements composed of conductive magnetic material, each of said elements being in the form of a thin film, said elements being arranged in the form of a matrix having a plurality of rows and columns, horizontal conductor means inductively coupled to selected rows, vertical conductor means inductively coupled to selected columns, means for supplying pulses to selected ones of said horizontal and vertical conductors for applying a magnetic field in either of two directions to a selected element for varying the magnetoresistance of said element in a given direction, electrically conductive means conductively connected to said element for providing a current flow through said element in said given direction, and means responsive to the variation in said current flow caused by the variation of said magnetoresistance for providing an output signal from said element.

11. A memory system comprising a plurality of elements of conductive magnetic material arranged in rows and columns, a plurality of horizontal conductors each inductively coupled to a respective row of said elements, a plurality of vertical conductors each inductively coupled to a respective column of said elements, means for providing current flow through each of said elements in a given direction, means for applying a pulse along a selected one of said horizontal conductors, means for applying a pulse along a selected one of said vertical conductors, the element located at the intersection of said selected ones of said horizontal and vertical conductors having thereby applied thereto a magnetic field in one of two directions as determined by the direction and magnitude of said pulses, said magnetic field establishing a magnetoresistive condition in said element and thereby determining said current flow through said element.

12. A memory system comprising an array of conductive magnetic material elements arranged in rows and columns, horizontal conductor means inductively coupled to each of said rows, vertical conductor means inductively coupled to each of said columns, means for supplying a pulse of a predetermined magnitude and a first direction to a horizontal conductor means coupled to a selected one of said horizontal rows, means for supplying a pulse of a predetermined magnitude and one of a first and a second direction to a vertical conductor means coupled to a selected one of said vertical rows, the one of said elements located at the intersection of said selected horizontal and vertical row having thereby applied thereto a magnetic field of one of two directions thereby establishing one of two conditions in said element, and means electrically contacting each element for establishing a current flow through said element in a given direction, and responsive to the condition of said element relative to said given current flow direction for providing an output indicative of said element condition.

References Cited

UNITED STATES PATENTS

| | | | |
|---|---|---|---|
| 3,030,612 | 4/1962 | Rubens | 340—174 |
| 3,070,783 | 12/1962 | Pohm | 340—174 |
| 3,076,958 | 2/1963 | Pohm | 340—174 |
| 3,128,390 | 4/1964 | Pettus et al. | 307—88 |
| 3,160,863 | 12/1964 | Partovi et al. | 340—174 |
| 3,177,370 | 4/1965 | Pettus et al. | 307—88 |
| 3,432,832 | 3/1969 | Holtwijk | 340—174 |

JAMES W. MOFFITT, Primary Examiner